US008959552B2

(12) United States Patent
Howcroft et al.

(10) Patent No.: US 8,959,552 B2
(45) Date of Patent: Feb. 17, 2015

(54) SYSTEMS AND METHODS TO PERFORM ACTIONS UPON CONTENT ITEMS ASSOCIATED WITH MULTIPLE SERIES SUBSCRIPTIONS

(75) Inventors: Jerry Howcroft, Beverly Hills, MI (US); Kathy Piatt, Cedar Park, TX (US); Michael Raftelis, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 430 days.

(21) Appl. No.: 12/604,562

(22) Filed: Oct. 23, 2009

(65) Prior Publication Data

US 2011/0099582 A1 Apr. 28, 2011

(51) Int. Cl.
*G06F 13/00* (2006.01)
*H04N 5/76* (2006.01)
*H04N 21/4147* (2011.01)

(52) U.S. Cl.
CPC ............ *H04N 5/76* (2013.01); *H04N 21/4147* (2013.01)
USPC ................. 725/46; 725/37; 725/38; 386/248; 386/262; 386/295; 386/296

(58) Field of Classification Search
CPC . H04N 5/76; H04N 21/4147; H04N 21/4532; G11B 27/105
USPC ......... 386/248, 261, 262, 291, 293, 296, 297, 386/239, 247, 279, 295; 725/28, 38, 44–47, 725/58, 37
See application file for complete search history.

(56) References Cited

U.S. PATENT DOCUMENTS

| 5,574,662 | A | 11/1996 | Windrem et al. |
| 7,882,520 | B2 * | 2/2011 | Beach et al. ..................... 725/37 |
| 2002/0076195 | A1 * | 6/2002 | Nakajima et al. ............... 386/46 |
| 2004/0040037 | A1 * | 2/2004 | Kim ................................ 725/40 |
| 2004/0213557 | A1 * | 10/2004 | Krakirian et al. ............. 386/108 |
| 2005/0204388 | A1 * | 9/2005 | Knudson et al. ................ 725/58 |
| 2005/0246738 | A1 * | 11/2005 | Lockett et al. .................. 725/43 |
| 2006/0031880 | A1 * | 2/2006 | Stark et al. ...................... 725/45 |
| 2006/0136966 | A1 * | 6/2006 | Folk, II ........................... 725/58 |
| 2007/0033232 | A1 * | 2/2007 | Malloy ......................... 707/200 |
| 2007/0078898 | A1 * | 4/2007 | Hayashi et al. ............ 707/104.1 |
| 2008/0172689 | A1 * | 7/2008 | Feder et al. ..................... 725/28 |
| 2008/0196065 | A1 * | 8/2008 | Cheng et al. .................... 725/58 |
| 2009/0070818 | A1 * | 3/2009 | Lee et al. ......................... 725/46 |
| 2009/0142042 | A1 * | 6/2009 | Branam ......................... 386/124 |
| 2009/0220216 | A1 * | 9/2009 | Marsh et al. .................. 386/124 |
| 2009/0310937 | A1 * | 12/2009 | Ellis et al. ....................... 386/83 |

(Continued)

FOREIGN PATENT DOCUMENTS

JP 2008-271114 * 6/2008 ............... H04N 5/76

OTHER PUBLICATIONS

TiVo Series 3 User Manual; TiVo® service running on the TiVo® brand Series3™ HD Digital Media Recorder, © 2006 TiVo Inc. (146 pages).

*Primary Examiner* — Hung Dang
*Assistant Examiner* — Mishawn Dunn
(74) *Attorney, Agent, or Firm* — Toler Law Group, PC

(57) ABSTRACT

Methods and systems are disclosed that include receiving an instruction to compare at least one criterion to content items associated with multiple series subscriptions. A method includes issuing an instruction to selectively perform an action upon those content items that match the at least one criterion.

20 Claims, 13 Drawing Sheets

(56) References Cited

U.S. PATENT DOCUMENTS

| | | | |
|---|---|---|---|
| 2010/0014830 A1* | 1/2010 | Jang | 386/83 |
| 2010/0061708 A1* | 3/2010 | Barton | 386/124 |
| 2010/0088291 A1* | 4/2010 | Bhogal et al. | 707/705 |
| 2010/0131988 A1* | 5/2010 | Kent et al. | 725/58 |
| 2010/0138860 A1* | 6/2010 | Goodwin et al. | 725/38 |
| 2010/0199219 A1* | 8/2010 | Poniatowski et al. | 715/825 |
| 2010/0299681 A1* | 11/2010 | Maskatia et al. | 719/328 |
| 2011/0179129 A1* | 7/2011 | McKissick et al. | 709/206 |
| 2012/0141096 A1* | 6/2012 | Ellis et al. | 386/297 |

* cited by examiner

SYSTEMS AND METHODS TO PERFORM ACTIONS UPON CONTENT ITEMS ASSOCIATED WITH MULTIPLE SERIES SUBSCRIPTIONS

FIELD OF THE DISCLOSURE

The present disclosure is generally related to comparing at least one criterion to content items associated with multiple series subscriptions and selectively performing actions upon content items that match the at least one criterion.

BACKGROUND

The advent of Digital Video Recorders (DVRs) has enabled viewers of television programming to exercise greater control over their viewing experience. DVRs allow viewers to pause, rewind, fast forward, and record broadcast programming, thereby giving the viewer a greater ability to view programming at their own convenience. Viewers can record television programming by scheduling a single recording of an event such as a live boxing match. Viewers can also record television programming by establishing a series subscription which represents a recurring series of scheduled recordings. For example, a viewer can create a series subscription to record all episodes of a particular television series, such as Family Guy, American Idol, or Entourage. Viewers can also tailor a series subscription to only record new episodes of a series so that duplicate recordings are not saved. While DVRs have enabled enhanced viewing, programming of DVRs with an increasing number of channels and variety of content can be time consuming and complex.

DETAILED DESCRIPTION

Systems and methods for comparing at least one criterion to content items associated with multiple series subscriptions and selectively performing actions upon content items that match the at least one criterion are disclosed. The disclosed systems and methods may enable a subscriber of a television service to manage content that is recorded at a digital video recorder (DVR) that is accessible to the user. The disclosed systems and methods may further enable the subscriber of the television service to manage content that is scheduled for recording on the DVR.

In a first particular embodiment, a method is disclosed that includes receiving, at a media recorder device, an instruction to compare at least one criterion to content items associated with multiple series subscriptions. The content items include at least a first set of episodes to be broadcast that are associated with a first series subscription and a second set of episodes to be broadcast that are associated with a second series subscription. The method also includes issuing, by the media recorder device, an instruction to selectively perform an action upon those content items that match the at least one criterion.

In a second particular embodiment, a system is disclosed that executes instructions to compare at least one criterion to content items associated with multiple series subscriptions. The content items include at least a first set of episodes to be broadcast that are associated with a first series subscription and a second set of episodes to be broadcast that are associated with a second series subscription. The system also executes instructions to selectively perform an action upon those content items that match the at least one criterion.

In a third particular embodiment, a media recorder device is disclosed that compares at least one criterion to content items associated with multiple series subscriptions. The media recorder device records content and selectively performs an action upon those content items that match the at least one criterion.

Figure 1:
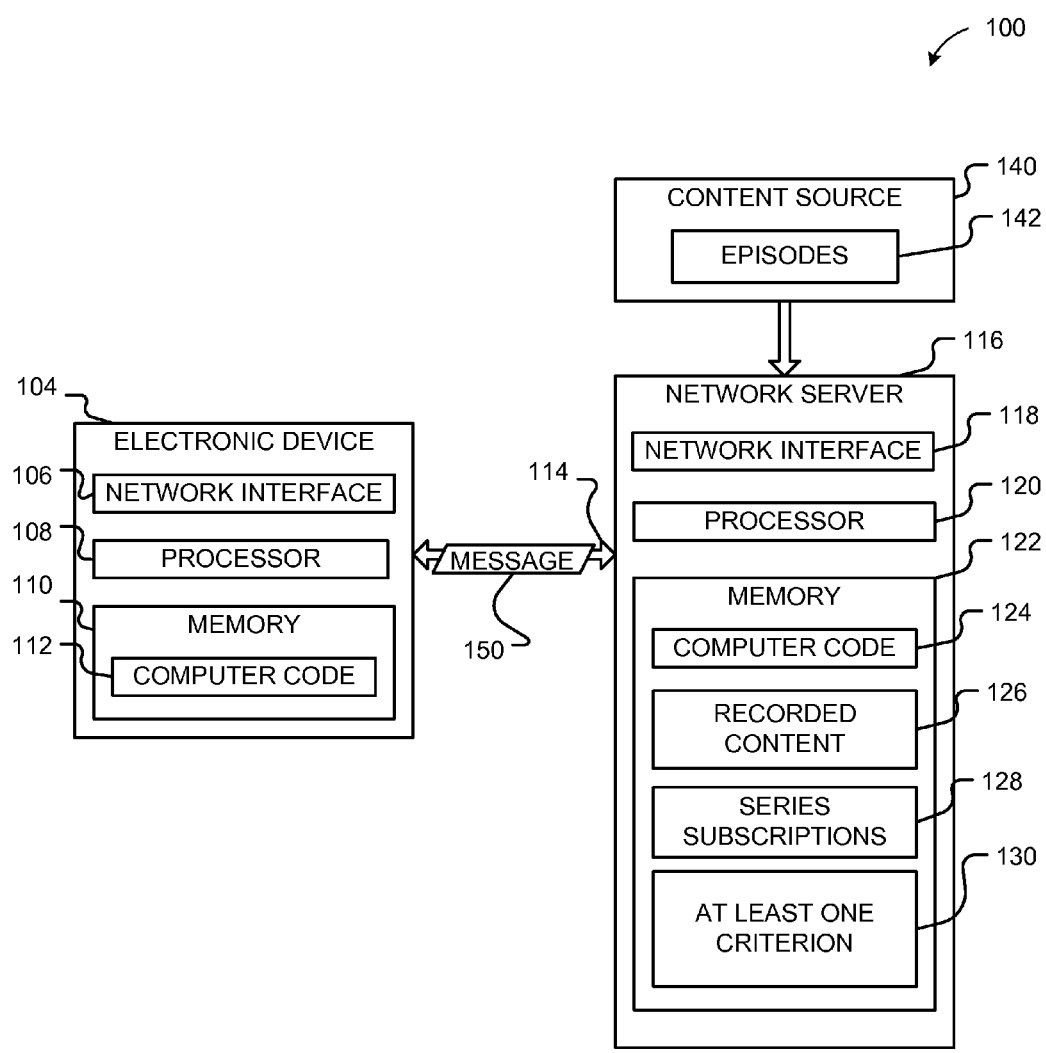
FIG. 1 is a block diagram of a first particular embodiment of a system to compare at least one criterion to content items associated with multiple series subscriptions and to selectively perform actions upon content items that match the at least one criterion.

Referring to FIG. 1, a system 100 is disclosed. The system 100 includes an electronic device 104, a communication network 114, and a network server 116. The electronic device 104 is coupled via the communication network 114 to the network server 116. The electronic device 104 includes a network interface 106, a processor 108, and a memory 110 that includes computer code 112. The network server 116 includes a network interface 118, a processor 120, and a memory 122. The memory 122 includes computer code 124, recorded content 126, series subscriptions data 128, and at least one criterion 130.

The recorded content 126 can include any programming that is recorded at a media recorder device, such as a DVR. Examples of recorded content 126 include an episode of a television program, a movie, a sporting event, and other programming Such recorded content can be replayed at a user's request.

Series subscriptions 128 include a plurality of related scheduled recordings at the media recorder device. Examples of a series subscription 128 include a series subscription that records all broadcasts of episodes of a television program, a series subscription that records all first broadcasts of episodes of a television program, a series subscription that records programming that is aired on a specified channel at a specified time, and a series subscription to record all future episodes of television programs that are in a specified genre.

The at least one criterion 130 can include information that is used to identify the recorded content 126 and the series subscriptions 128 that can be retained at the network server 116. The at least one criterion 130 can specify, for example, a maximum number of episodes associated with a series subscription that may be recorded or a maximum rating of content that can be recorded based on a series subscription. A rating may be used to rate the suitability of content for certain audiences. Examples of common ratings include G, PG, PG-13, and R.

The computer code 124 may be implemented as a computer program that includes instructions that are executable by the processor 120 to compare at least one criterion 130 to content items associated with multiple series subscriptions, such as one or more of the series subscriptions 128. The content items include at least a first set of episodes to be broadcast that are associated with a first series subscription and a second set of episodes to be broadcast that are associated with a second series subscription. For example, the first set of episodes to be broadcast may include an all episodes in an entire season of a first television program that have not been aired and the second set of episodes to be broadcast may include all episodes of nightly news program that have not been aired. The content items may also include additional sets of episodes to be broadcast that are associated with additional series subscriptions. Although the network server 116 is depicted as including the series subscription data 128 within the memory of the network server 116, series subscription data can be received from an external source such as electronic device 104. In such an example, information describing the first set of episodes of the first series subscription and the second set of episodes of the second series subscription is received from the external source for use by the network server 116. As an additional example, information describing the series subscription data 128 may be received from an external source, such as a DVR, by sending a request for information identifying each of the multiple series subscriptions on the DVR.

The network server 116 may retrieve content items, such as the first and second episodes to be broadcast, from a content source 140. Episodes 142 may be acquired by the network server 116 and stored within the memory 122 for future broadcast via the communications network 114 to the electronic device 104. The computer code 124 also includes instructions executable by the processor 120 to selectively perform an action upon those content items that match at least one criterion 130.

The network server 116 may retrieve episodes 142 from the content source 140 for subsequent broadcast. The network server 116 may include multiple series subscriptions 128 that may be comprised of multiple scheduled recordings of television programming, such as one or more of the episodes 142 retrieved from the content source 140. In addition, content of previously recorded broadcast episodes may be stored within the memory 122 as recorded content 126. Thus, the memory 122 includes series subscription data 128 as well as previously recorded content 126. Both the recorded content 126 and episodes 142 associated with one or more of the series subscriptions 128 may be communicated via the network 114 to the electronic device 104.

The computer code 112 within the memory 110 of the electronic device 104 is executable by the processor 108 to perform various operations. For example, the processor 108 executing the computer code 112 may perform a series subscription cleanup operation. In a particular illustrated embodiment, the processor 108 executing the computer code 112 may perform a cleanup operation as requested by a user and may issue a cleanup message 150 that is communicated from the electronic device 104 to the network server 116 over the communications network 114. Upon receipt of the cleanup message 150, the network server 116 processes the cleanup message 150 at the processor 120 and initiates cleanup processing of the recorded content 126 or the series subscription data 120.

For example, the at least one criterion 130 may be compared to the series subscription data 128 or to the recorded content 126. When the at least one criterion 130 matches the series subscription data 128 or the recorded content 126, the series subscription data 128 or the recorded content 126 may be saved for future use. However, when the at least one criterion 130 does not match the series subscription data 128 or the recorded content 126, the series subscription data 128 or the recorded content 126 may be discarded or otherwise deleted or marked as unusable for future use within the memory 122. Alternatively, the at least one criterion 130 may be defined to identify the series subscription data 128 or the recorded content 126 that is to be discarded instead of the series subscription data 128 or the recorded content 126 to be maintained. In this scenario, the cleanup operation would identify recorded content 126 or series subscription data 128 that matches the at least one criterion 130 and the series subscription data 128 or the recorded content 126 matching the at least one criterion 130 would be discarded or otherwise marked as unusable or deleted. Upon completion of the cleanup operation that was issued in response to the cleanup message 150 received at the network server 116, the network server 116 may send a completion message (not shown) over the communications network 114 to inform the electronic device 104 that the requested cleanup operation has been completed. A customer, user, or subscriber of the electronic device 104 may receive a notification that the cleanup operation has been completed.

The system 100 may be beneficially used by a user of the electronic device 104 to perform a cleanup operation on multiple episodes or multiple series subscriptions in a manner that provides an efficient and easy to use user interface for the electronic device 104. For example, a user of the electronic device 104 may perform a cleanup operation on multiple subscriptions with a single command and thereby avoid manual entry of episode-by-episode or subscription-by-subscription cleanup requests. Thus, the system 100 provides an automated and efficient series subscription cleanup operation upon user command via a simplified user interface. The system 100 may allow for a single instruction or single click operation by a user of the electronic device 104 to perform cleanup operations that remove multiple series subscriptions that satisfy certain criteria. In addition, the system 100 may enable a user of the electronic device 104 to elect to modify series subscription parameters across multiple series subscriptions.

The system 100 may also enable other single instruction or single click operations of the electronic device 104. For example, a user of the electronic device 104 may remove or place a parental control personal identification number (PIN) on all content that is rated at or above a certain level. In addition, the user may perform an operation to monitor content to screen the content for offensive language, adult situations, or other undesirable features. Thus, a universal interface to remove or to mark certain content as non-displayable for multiple types of content, including recorded content and series subscriptions, is enabled and offered to a user of the electronic device 104.

Figure 2:
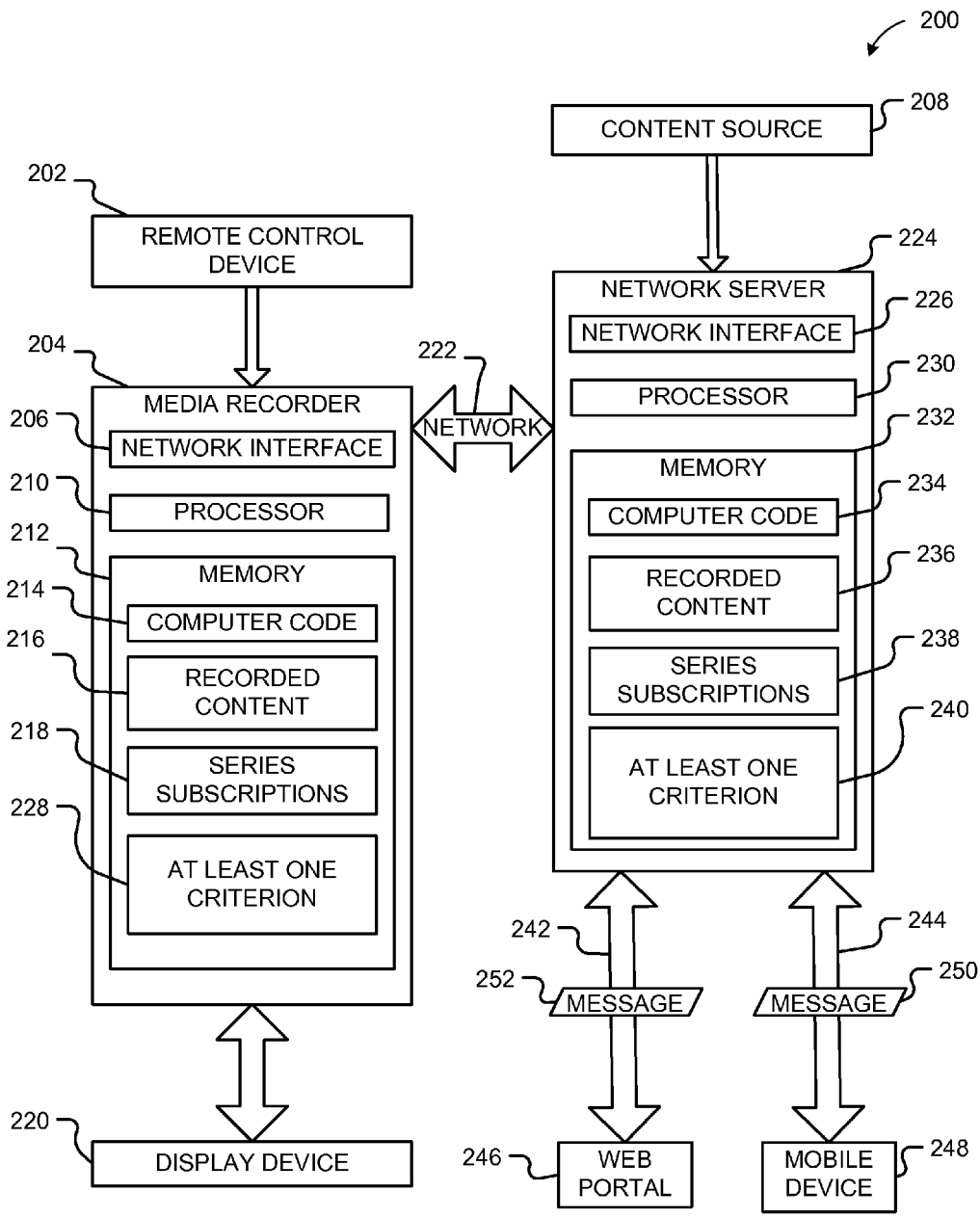
FIG. 2 is a block diagram of a second particular embodiment of a system to compare at least one criterion to content items associated with multiple series subscriptions and to selectively perform actions upon content items that match the at least one criterion.

Referring to FIG. 2, a second particular combination of a system 200 is shown. The system 200 includes a media recorder device 204 coupled via a network 222 to a network server 224. The network server 224 is coupled to an external network that may be coupled to a content source 208. The network server 224 is also coupled to a web portal 246 via a data network 242 and to a mobile device 248 via a wireless network 244. The network server 224 includes a network interface 226, a processor 230, and a memory 232. The memory 232 includes computer code 234, recorded content 236, series subscription data 238, and at least one criterion 240.

The media recorder device 204 includes a network interface 206, a processor 210, and a memory 212. The memory 212 includes computer code 214, recorded content 216, series subscriptions data 218, and at least one criterion 228. While the recorded content 216 is shown within the same memory 212 as the computer code 214, it should be understood that the recorded content 216 may be stored at a separate memory, such as within a DVR integrated within the media recorder device 204 or alternatively coupled for access to the media recorder device 204 in a separate stand-alone unit.

The computer code 214 may be implemented as computer program instructions that are executable by the processor 210. The computer program instructions may be executed by the processor 210 to retrieve the at least one criterion 228 from the memory 212 and to compare the at least one criterion 228 to content items associated with multiple series subscriptions. The content items may include at least a first set of recorded episodes of a first broadcast series of programs and may also include a second set of recorded episodes of a second broadcast series of programs. It should be understood that multiple episodes for multiple series of programs may be recorded and stored within the memory 212 of the media recorder device 204. The media recorder device 204 may also include other content. For example, the media recorder device 204 may include single scheduled recordings associated with a live event. As another example, the other content may include a video on demand program or over the top content retrieved by the media recorder device 204 from the network server 224 via the network 222. In addition, user content may be uploaded and stored at the media recorder device 204. Thus, the media recorder device 204 includes a plurality of different types of content including series subscription content as well as other content.

In a particular illustrated embodiment, the computer code 214 is executable by the processor 210 to compare at least a portion of the at least one criterion 228 to the subscription content but not to other content stored within the media recorder device 204. The processor 210, responsive to the executable computer code 214, selectively performs an action upon those content items that match the at least one criterion 228. For example, the processor 210 may perform an action of deleting certain recorded content items 216 that match the at least one criterion 228. The at least one criterion 228 may be selectable or definable by a user. For example, the at least one criterion 228 may include a maximum amount of time since an episode was recorded based on a series subscription, a maximum amount of time since an episode associated with a series subscription was broadcast, a maximum number of episodes associated with a series subscription that may be recorded, a maximum amount of time since an episode associated with a series subscription has been viewed, and a maximum rating of content that can be recorded based on a series subscription. Other examples of suitable criteria include parental control criteria, content rating criteria, or other user defined criteria appropriate for certain series subscriptions. Content that matches the at least one criterion 228 may have actions performed on the content, such as having content deleted, marked for deletion, marked for cleanup or archiving, or other actions that may be suitable for content that is no longer desired by the user of the media recorder device 204. Thus, the at least one criterion 228 may be evaluated by the processor 210 executing the computer code 214 to perform a cleanup operation on multiple series subscriptions stored within the memory 212 of the media recorder device 204.

The media recorder device 204 may be embodied within a set-top box (STB) environment. Alternatively, the media recorder device 204 may be a stand-alone DVR device or other media recording apparatus. Thus, the media recorder device may include DVR functionality and features as well as performing the cleanup operation and other actions to certain content of multiple series subscriptions. In addition to performing cleanup of content matching the at least one criterion 228, the processor 210 may notify a user of the status of the cleanup, a report of completion of the cleanup operation, or other information associated with the requested cleanup operation at the display device 220. The media recorder device 204 is responsive to input from the user received via the remote control device 202. For example, the media recorder device 204, responsive to a user command initiated via the remote control device 202, may launch the computer code 214, may pause the computer code 214, or may cancel the computer code 214 in the event that the user decides not to continue to perform the cleanup operation on the identified content.

The network server 224 may perform cleanup operations instead of or in addition to the media recorder device 204. For example, the network server 224 may receive a cleanup message (not shown) from the media recorder device 204. In response to receiving the cleanup message, the network server 224 may perform a cleanup operation and compare recorded content 236, series subscriptions data 238, or both, to the at least one criterion 240 stored within the memory 232. Upon identifying series subscriptions 238 or recorded content 236 that matches the at least one criterion 240, the processor 230 responsive to the computer code 234 may delete or otherwise discard the matching content.

Alternatively, the network server 224 may receive a cleanup message 250, 252 from a web portal 246 or from a mobile device 248 such as a cell phone or smart phone. The web portal 246 may communicate the cleanup message 252 over a data network 242, such as via the Internet. Similarly, the mobile device 248 may communicate a cleanup message 250 over a wireless network 244 to the network server 224.

Thus, the network server 224 may respond to a remote device of a user to perform a cleanup operation on stored content.

In a particular embodiment, the network server 224 stores the content within a DVR device or other storage device that is suitable for storing media content. Thus, the network server 224 may provide a remote or network based DVR capability and may perform user requested cleanup operations on multiple series subscriptions and recorded content based on user defined or selected criteria.

The media communication and recording system 200 is suitable to enable a DVR customer to manage and modify multiple series subscriptions improving their user experience. In addition, the system 200 enables a user to cleanup old subscriptions based on current programming or DVR event information. As an example, the DVR event information may include notifications that the amount of memory available for storing recorded content has fallen below a predefined threshold or similar events to encourage a user to perform a cleanup operation. Thus, executing a cleanup operation of DVR programming on multiple series subscriptions and other recorded content identified by selectable criteria provides efficient cleanup and an improved user experience with respect to using DVR capabilities.

Figure 3:
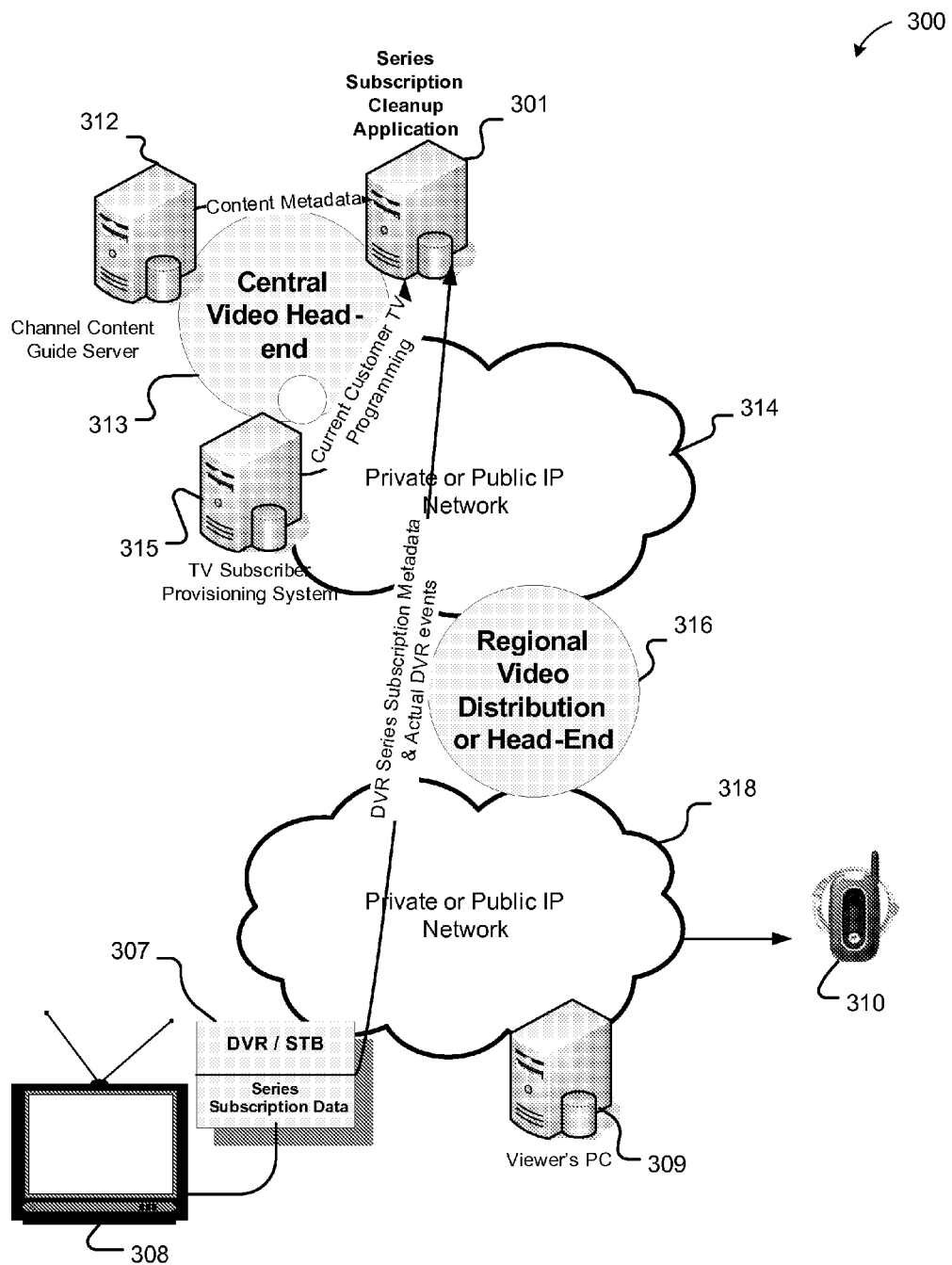
FIG. 3 is a diagram of a third particular embodiment of a system to compare at least one criterion to content items associated with multiple series subscriptions and to selectively perform actions upon content items that match the at least one criterion.

The illustrative embodiment of FIG. 3 depicts a system that includes a channel content guide server 312 coupled to a series subscription cleanup application 301 at a central video headend 313. The system further includes a TV subscriber provisioning system coupled to the series subscription cleanup application 301 at the central video head 313. The system includes public or private IP networks 314 and 318 and a regional video distribution or head end 316 operatively coupling the series subscription cleanup application 301 to a DVR/STB 307. In this example, the DVR may be included as part of the STB or may be a stand-alone DVR accessible by the STB. Also connected to the private or public IP network 318 are a computer 309 and a mobile device 310.

The series subscription cleanup application 301 can be embodied as computer program instructions executable by a processor. The series subscription cleanup application 301 operates to modify series subscription data on the DVR/STB 307. The series subscription cleanup application 301 can modify series subscription data on the DVR/STB 307 by comparing at least one criterion specified by a user to content metadata received from the channel content guide server 312. The content metadata received from the channel content guide server 312 may include parameters that describe programming that is delivered to a television 308 via the DVR/STB 307. The parameters can include information that identifies whether an episode of a program is new or a rerun, information that identifies the rating of content, information that identifies that content is associated with a particular television program, and other information that may be used by the series subscription cleanup application 301 to determine whether content should be retained by the DVR/STB 307.

The series subscription cleanup application 301 is also coupled to the TV subscriber provisioning system 315 that provides a data feed into the cleanup application 301. The data feed identifies current programming to which the user has subscribed. The series subscription cleanup application 301 also receives a data feed from the DVR/STB 307 that provides information related to the DVR/STB 307. The information can identify series subscriptions that are currently in place at the DVR/STB, information identifying content that is stored at the DVR/STB, the amount of memory available at the DVR/STB, and other information that can be used by the series subscription cleanup application 301 to manage series subscriptions and stored content at the DVR/STB 307.

Figure 4:
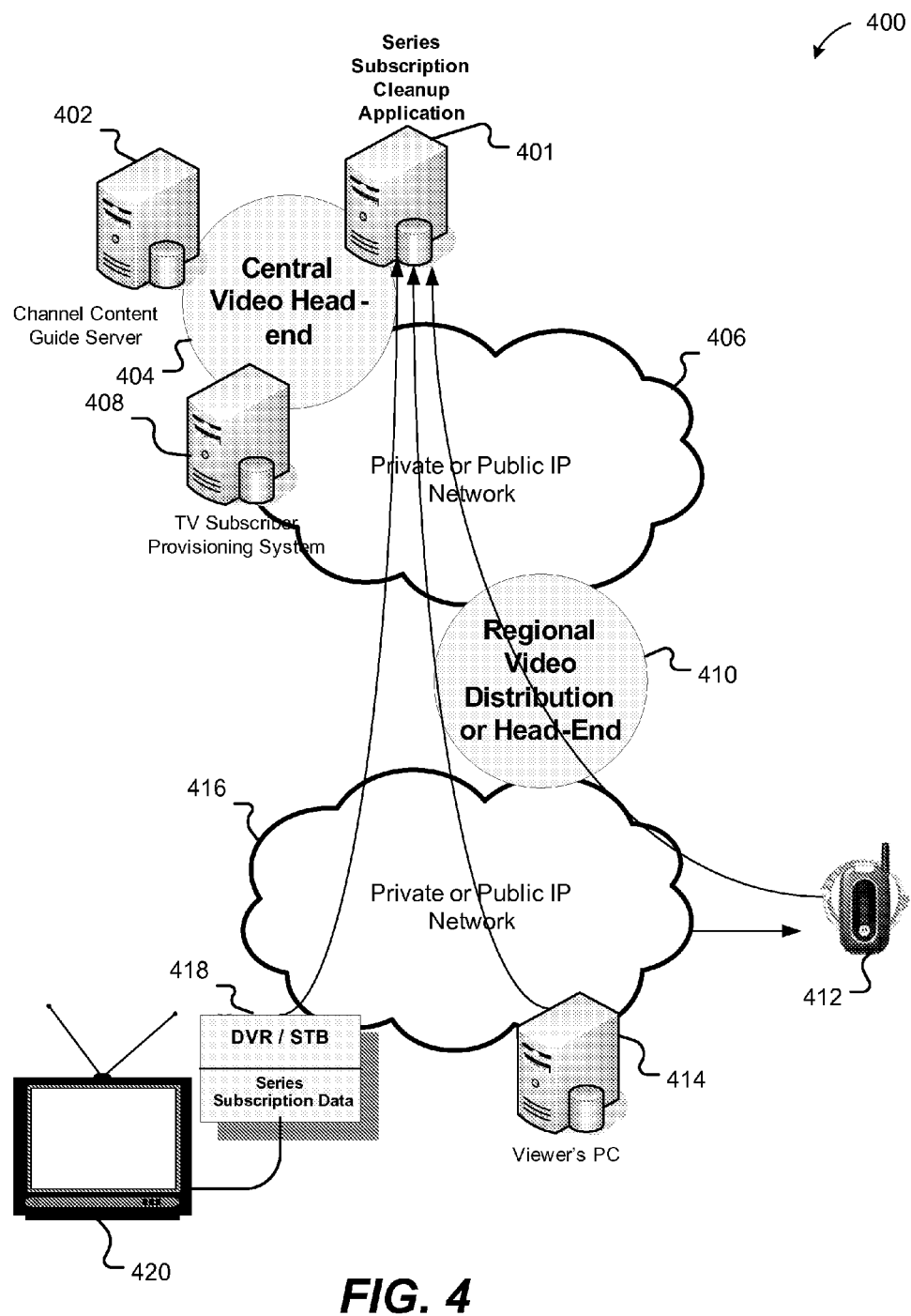
FIG. 4 is a diagram of a fourth particular embodiment of a system to compare at least one criterion to content items associated with multiple series subscriptions and to selectively perform actions upon content items that match the at least one criterion.

The illustrative embodiment of FIG. 4 depicts a system that includes a channel content guide server 402, a series subscription cleanup application 401, a TV subscriber provisioning system 408, public or private IP networks 406 and 416, and a regional video distribution or head-end 410. The system also includes a mobile device 412, a personal computer 414, and a DVR/STB 418 that are each capable of communication with the series subscription cleanup application 401 via the IP networks 416, 406.

The series subscription cleanup application 401 can be embodied as computer program instructions executable by a processor. The series subscription cleanup application 401 operates to modify series subscription data on the DVR/STB 418. The series subscription cleanup application 401 may be accessed by a user from a television 420 that is connected to the DVR/STB 418. The user may access DVR cleanup screens from their television 420 via a user interface to the series subscription cleanup application 401 that is viewable at the user's television 420. The series subscription cleanup application 401 may provide the user with an interactive screen so that the user can select cleanup options and invoke cleanup processing. When the user has made their selections, the series subscription cleanup application will process the selected cleanup criteria using the appropriate data feed information described above in FIG. 3 in order to determine the expected results of the selected cleanup options. The user is then presented with the expected results and queried by the series subscription cleanup application 401 to determine if the user would like to proceed with cleanup processing.

Alternatively, the series subscription cleanup application 401 may be accessed by a user via their personal computer 414 or via the user's mobile device 412. The embodiment of FIG. 4 therefore allows the user the ability to initiate cleanup processing at the DVR/STB 418 remotely via a personal computer 414 or mobile device 412. Because the user is able to initiate cleanup processing at their DVR/STB 418 via their personal computer 414 or mobile device 412, the system enables the user to cleanup saved content and series subscriptions at the user's DVR/STB 418 from any place at any time.

Figure 5:
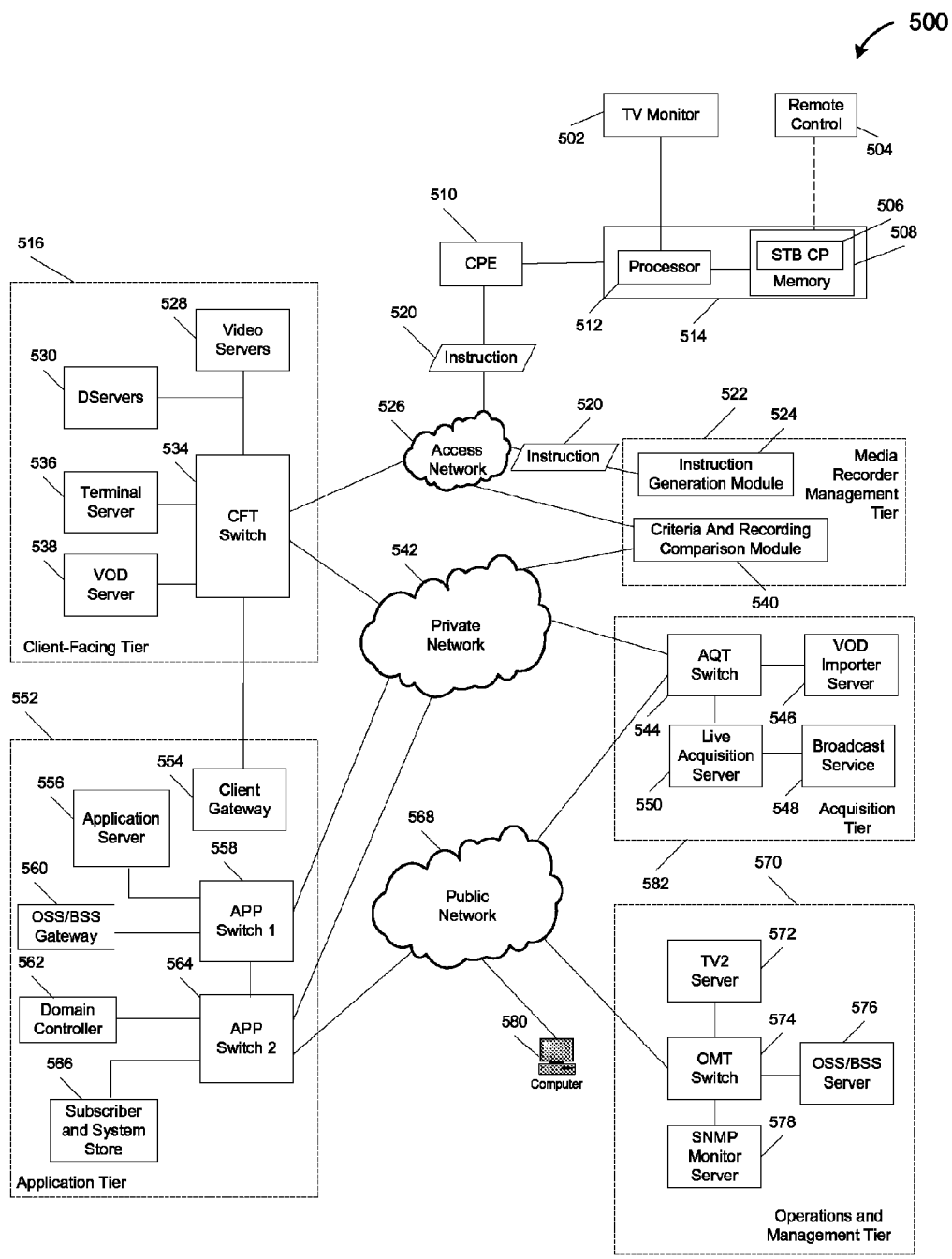
FIG. 5 is a block diagram of a fifth particular embodiment of a system to compare at least one criterion to content items associated with multiple series subscriptions and to selectively perform actions upon content items that match the at least one criterion.

Referring to FIG. 5, an embodiment of a system to compare at least one criterion to content items associated with multiple series subscriptions and selectively perform actions upon those content items that match the at least one criterion is illustrated and generally designated 500. In the embodiment of FIG. 5, comparing at least one criterion to series subscriptions and performing actions upon series subscriptions is carried out in an Internet Protocol Television (IPTV) system. The embodiment of FIG. 5 is included only for illustrative purposes and in no way limits the scope of this disclosure. The television system can be a cable television system, a satellite television system, or any other television system. Furthermore, the embodiment of FIG. 5 describes only one possible implementation of an IPTV television system. The IPTV television system can be embodied in many other ways.

As shown, the system 500 can include a client facing tier 516, a media recorder management tier 522, an application tier 552, an acquisition tier 582, an operations and management tier 570, and a media recorder management tier 522. Each tier 516, 522, 552, 570, and 582 can be coupled to a private network 542; to a public network 568, such as the Internet; an access network 526; or to more than one of the private network 542, the public network 568, and the access network 526. For example, the client-facing tier 516 can be coupled to the private network 542 and the access network 526. The media recorder management tier 522 can be coupled to the private network 542 and the access network 526. Further, the application tier 552 can be coupled to the private network 542 and to the public network 568. The acquisition tier 582 can also be coupled to the private network 542 and to the public network 568. Additionally, the operations and management tier 570 can be coupled to the public network 568.

As illustrated in FIG. 5, the various tiers 516, 522, 552, 570, and 582 may communicate with each other via the private network 542, the public network 568, and the access network 526. For instance, the client-facing tier 516 can communicate with the application tier 552 and the acquisition tier 582 via the private network 542. The media recorder management tier 522 can communicate with the client facing tier 516 and the acquisition tier 582 via the private network 542. The application tier 552 can communicate with the acquisition tier 582 via the private network 542. Further, the application tier 552 can communicate with the acquisition tier 582 and the operations and management tier 570 via the public network 568. Moreover, the acquisition tier 582 can communicate with the operations and management tier 570 via the public network 568. In a particular embodiment, elements of the application tier 552, including, but not limited to, a client gateway 554, can communicate directly with the client-facing tier 516.

The client-facing tier 516 may communicate with user equipment via an access network 526, such as an IPTV access network. In an illustrative embodiment, customer premises equipment (CPE) 510 can be coupled to a local switch, router, or other device of the access network 526. The client-facing tier 516 can communicate with a representative set-top box device 514 at a customer premise via the CPE 510. The CPE 510 can include routers, local area network devices, modems, such as digital subscriber line (DSL) modems, any other suitable devices for facilitating communication between a set-top box device and the access network 526, or any combination thereof.

In a particular embodiment, the client-facing tier 516 can be coupled to the CPE 510 via fiber optic cables. Alternatively, the CPE 510 can include DSL modems that are coupled to one or more network nodes via twisted pairs, and the client-facing tier 516 can be coupled to the network nodes via fiber-optic cables. The set-top box device 514 can process data received via the access network 526, via an IPTV software platform.

The set-top box device 514 can be coupled to a external display device, such as a television monitor 502. Moreover, the set-top box device 514 can communicate with a remote control 504. The set-top box device 514 can include IPTV set-top box devices as well as video gaming devices or consoles that are adapted to receive IPTV content. The set-top box device 514 can also include personal computers or other computing devices that are adapted to emulate set-top box device functionalities and any other device adapted to receive IPTV content and transmit data to an IPTV system via an access network.

In an exemplary, non-limiting embodiment, the set-top box device 514 can receive data, video, or any combination thereof, from the client-facing tier 516 via the access network 526 and render or display the data, video, or any combination thereof, at the display device 502 to which it is coupled. In an illustrative embodiment, the set-top box device 514 can include tuners that receive and decode television programming signals or packet streams for transmission of content to the display device 502. Further, the set-top box device 514 can include a STB processor 512 and a STB memory device 508 that is accessible to the STB processor 512. In one embodiment, a computer program, such as the STB computer program 506, can be embedded within the STB memory device 508. In another illustrative embodiment, a user computing device, such as a personal computer, laptop or local server, can be coupled to the set-top box device 514, for example, via a universal serial bus (USB) connection or other connection.

The set-top box device 514 may also be coupled to the media recorder management tier 522 via access network 526. The set-top box device 514 may receive instructions 520 from the instruction generation module 524 of the media recorder management tier 522. The instructions 520 are generated in response to a comparison between at least one criterion and content items associated with multiple series subscriptions that may be stored in memory 508 at the set-top box device 514. Such a comparison is performed by the criteria and recording comparison module 540 at the media recorder management tier 522. The instructions 520 are received at the set-top box device 514 and executed at the processor 512 of the set-top box device 514 such that actions are selectively performed upon content items stored in the memory 508 of the set-top box device 514.

In an illustrative embodiment, the client-facing tier 516 can include a client-facing tier (CFT) switch 534 that manages communication between the client-facing tier 516 and the access network 526 and between the client-facing tier 516 and the private network 542. As illustrated, the CFT switch 534 is coupled to one or more data servers, such as D-servers 530, that store, format, encode, replicate, or otherwise manipulate or prepare video content for communication from the client-facing tier 516 to the set-top box device 514. The CFT switch 534 can also be coupled to a terminal server 536 that provides terminal devices with a connection point to the private network 542. In a particular embodiment, the CFT switch 534 can be coupled to a video-on-demand (VOD) server 538 that stores or provides VOD content imported by the IPTV system 500.

Further, the CFT switch 534 is coupled to one or more video servers 528 that receive video content and transmit the content to the set-top box 514 via the access network 526. In a particular embodiment, the CFT switch 534 can be coupled to one or more publication servers that facilitate the formation of groups that share private content and the inclusion of indicators of such private content with video content received by users in a group.

In an illustrative embodiment, the client-facing tier 516 can communicate with a large number of set-top boxes, such as the representative set-top box device 514 over a wide geographic area, such as a regional area, a metropolitan area, a viewing area, a designated market area or any other suitable geographic area, market area, or subscriber or customer group that can be supported by networking the client-facing tier 516 to numerous set-top box devices. In a particular embodiment, the CFT switch 534, or any portion thereof, can include a multicast router or switch that feeds one or more video streams from a video server to multiple set-top box devices.

As illustrated in FIG. 5, the application tier 552 can communicate with both the private network 542 and the public network 568. The application tier 552 can include a first application tier (APP) switch 558 and a second APP switch 564. In a particular embodiment, the first APP switch 558 can be coupled to the second APP switch 564. The first APP switch 558 can be coupled to an application server 556 and to an OSS/BSS gateway 560. In a particular embodiment, the application server 556 can provide applications to the set-top box device 514 via the access network 526, which enable the set-top box device 514 to provide functions, such as display, messaging, processing of IPTV data and VOD material, etc. In a particular embodiment, the OSS/BSS gateway 560 includes operation systems and support (OSS) data, as well as billing systems and support (BSS) data. In one embodiment, the OSS/BSS gateway 560 can provide or restrict access to an OSS/BSS server 576 that stores operations and billing systems data.

The second APP switch 564 can be coupled to a domain controller 562 that provides Internet access, for example, to users at their computers 580 via the public network 568. For example, the domain controller 562 can provide remote Internet access to IPTV account information, e-mail, personalized Internet services, or other online services via the public network 568. In addition, the second APP switch 564 can be coupled to a subscriber and system store 566 that includes account information, such as account information that is associated with users who access the IPTV system 500 via the private network 542 or the public network 568. In an illustrative embodiment, the subscriber and system store 566 can store subscriber or customer data and create subscriber or customer profiles that are associated with IP addresses of corresponding set-top box device 514.

In a particular embodiment, the application tier 552 can include a client gateway 554 that communicates data directly to the client-facing tier 516. The client gateway 554 may be coupled directly to the CFT switch 534. The client gateway 554 can provide user access to the private network 542 and the tiers coupled thereto. In an illustrative embodiment, the set-top box device 514 can access the IPTV system 500 via the access network 526, using information received from the client gateway 554. User devices can access the client gateway 554 via the access network 526, and the client gateway 554 can allow such devices to access the private network 542 once the devices are authenticated or verified. Similarly, the client gateway 554 can prevent unauthorized devices, such as hacker computers or stolen set-top box devices from accessing the private network 542, by denying access to these devices beyond the access network 526.

For example, when the representative set-top box device 514 accesses the client-facing tier 516 via the access network 526, the client gateway 554 can verify subscriber information by communicating with the subscriber and system store 566 via the private network 542. Further, the client gateway 554 can verify billing information and status by communicating with the OSS/BSS gateway 560 via the private network 542. In one embodiment, the OSS/BSS gateway 560 can transmit a query via the public network 568 to the OSS/BSS server 576. After the client gateway 554 confirms subscriber and/or billing information, the client gateway 554 can allow the set-top box device 514 to access IPTV content and VOD content at the client-facing tier 516. If the client gateway 554 cannot verify subscriber information for the set-top box device 514, e.g., because it is connected to an unauthorized twisted pair, the client gateway 554 can block transmissions to and from the set-top box device 514 beyond the access network 526.

As indicated in FIG. 5, the acquisition tier 582 can include an acquisition tier (AQT) switch 544 that communicates with the private network 542. The AQT switch 544 can also communicate with the operations and management tier 570 via the public network 568. In a particular embodiment, the AQT switch 544 can be coupled to a live acquisition server 550 that receives or acquires television content, movie content, advertisement content, other video content, or any combination thereof, from a broadcast service 548, such as a satellite acquisition system or satellite head-end office. In a particular embodiment, the live acquisition server 550 can transmit content to the AQT switch 544, and the AQT switch 544 can transmit the content to the CFT switch 534 via the private network 542.

In an illustrative embodiment, content can be transmitted to the D-servers 530, where it can be encoded, formatted, stored, replicated, or otherwise manipulated and prepared for communication from the video server(s) 528 to the set-top box device 514. The CFT switch 534 can receive content from the video server(s) 528 and communicate the content to the CPE 510 via the access network 526. The set-top box device 514 can receive the content via the CPE 510, and can transmit the content to the television monitor 502. In an illustrative embodiment, video or audio portions of the content can be streamed to the set-top box device 514.

Further, the AQT switch 544 can be coupled to a video-on-demand importer server 546 that receives and stores television or movie content received at the acquisition tier 582 and communicates the stored content to the VOD server 546 at the client-facing tier 516 via the private network 542. Additionally, at the acquisition tier 582, the video-on-demand (VOD) importer server 546 can receive content from one or more VOD sources outside the IPTV system 500, such as movie studios and programmers of non-live content. The VOD importer server 546 can transmit the VOD content to the AQT switch 544, and the AQT switch 544, in turn, can communicate the material to the CFT switch 534 via the private network 542. The VOD content can be stored at one or more servers, such as the VOD server 538.

When users issue requests for VOD content via the set-top box device 514, the requests can be transmitted over the access network 526 to the VOD server 538, via the CFT switch 534. Upon receiving such requests, the VOD server 538 can retrieve the requested VOD content and transmit the content to the set-top box device 514 across the access network 526, via the CFT switch 534. The set-top box device 514 can transmit the VOD content to the television monitor 502. In an illustrative embodiment, video or audio portions of VOD content can be streamed to the set-top box device 514.

FIG. 5 further illustrates that the operations and management tier 570 can include an operations and management tier (OMT) switch 574 that conducts communication between the operations and management tier 570 and the public network 568. In the embodiment illustrated by FIG. 5, the OMT switch 574 is coupled to a TV2 server 572. Additionally, the OMT switch 574 can be coupled to an OSS/BSS server 576 and to a simple network management protocol (SNMP) monitor 578 that monitors network devices within or coupled to the IPTV system 500. In a particular embodiment, the OMT switch 574 can communicate with the AQT switch 544 via the public network 568.

In an illustrative embodiment, the live acquisition server 550 can transmit content to the AQT switch 544, and the AQT switch 544, in turn, can transmit the content to the OMT switch 574 via the public network 568. In this embodiment, the OMT switch 574 can transmit the content to the TV2 server 572 for display to users accessing the user interface at the TV2 server 572. For example, a user can access the TV2 server 572 using a personal computer (PC) 580 coupled to the public network 568.

It will be appreciated that the system 500 of FIG. 5 can take advantage of the benefits provided by an IPTV television service relative to other television services. For example, the IP-based platform may provide the ability to integrate television services with other IP-based services such as high speed Internet access and VoIP telephone services. Furthermore, an IPTV television service may be less susceptible to loss of service issues that can arise during inclement weather relative to other television services such as a satellite television service or television services that utilize traditional broadcast television signals. As discussed herein, the embodiment of FIG. 5 is included for illustrative purposes and in no way is intended to limit the scope of the present application.

Figure 6:
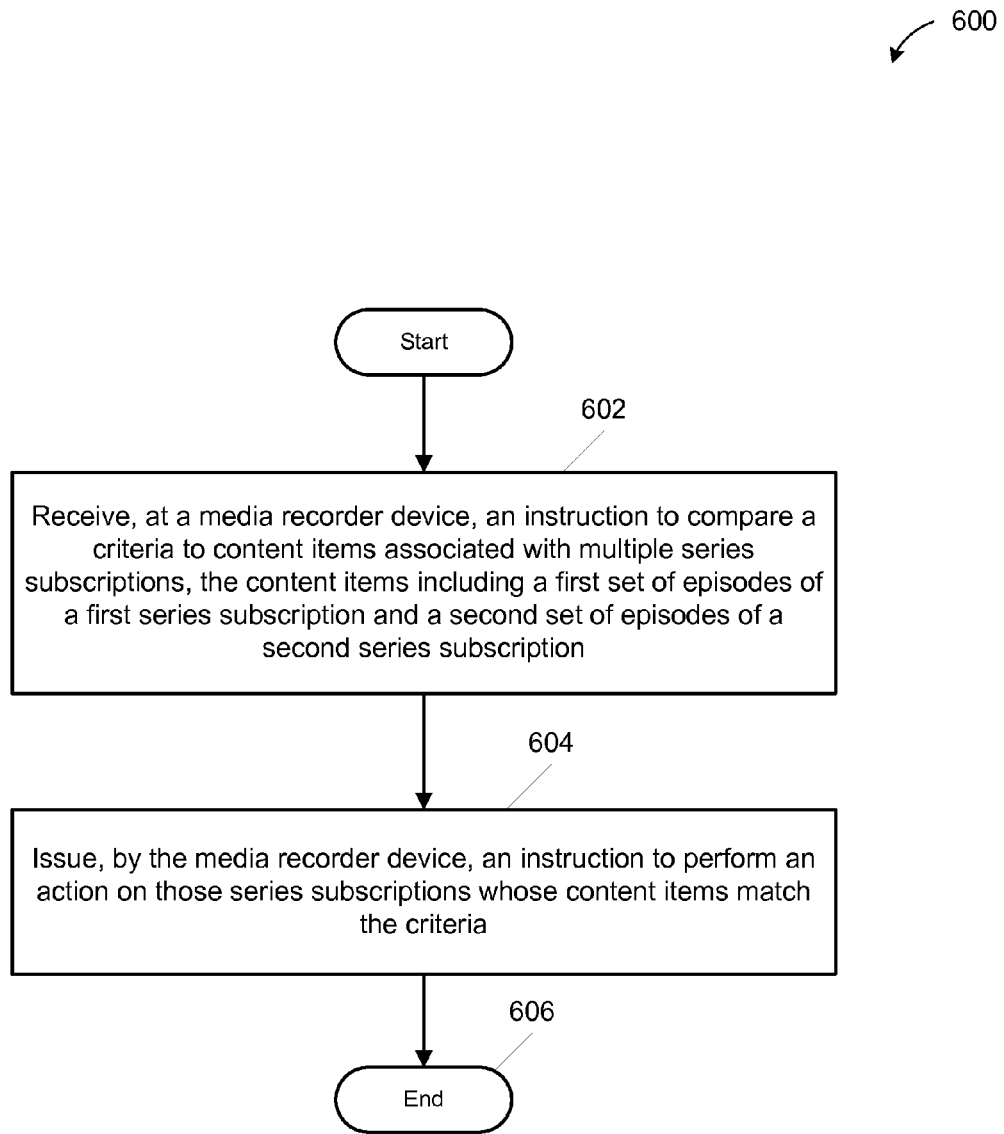
FIG. 6 is a flow diagram of a first particular embodiment of a method to compare at least one criterion to content items associated with multiple series subscriptions and to selectively perform actions upon content items that match the at least one criterion.

Referring to FIG. 6, a method of operating a media recorder device is illustrated. At 602, a media recorder device receives an instruction to compare a at least one criterion to content items associated with multiple series subscriptions. The content items include at least a first set of episodes of a first series subscription and a second set of episodes of a second series subscription. Recorded content can include any programming that is recorded at a media recorder device. Examples of recorded content include an episode of a television program, a movie, a sporting event, and other programming. Series subscriptions can be a plurality of related scheduled recordings at a media recorder device. Examples of a series subscription include a series subscription that records all future episodes of a particular television program, a series subscription that records all future episodes of a particular television program that have not been previously aired, a series subscription that records programming that is aired on a specified channel at a specified time, and a series subscription to record all future episodes of television programs that are in a specified genre of programming For example, in FIG. 2, the media recorder device 204 may receive an instruction to compare the at least one criterion 228 to recorded content items 216 associated with multiple series subscriptions 218.

Moving to 604, the media recorder device issues an instruction to perform an action on those series subscriptions whose content items match the at least one criterion. Series subscriptions that match the at least one criterion may have actions performed on the series subscription, such as deleting the series subscription, changing the priority level of the series subscription, deleting saved recordings that are associated with the series subscription, disabling the series subscription from causing content to be saved to the media recorder device, or other actions that may be suitable for content that is no longer desired by a user of the media recorder device. For example, in FIG. 2, the media recorder device 204 may issue an instruction to perform an action, such as a delete action, on those series subscriptions 218 whose recorded content items 216 match the at least one criterion 228.

Figure 7:
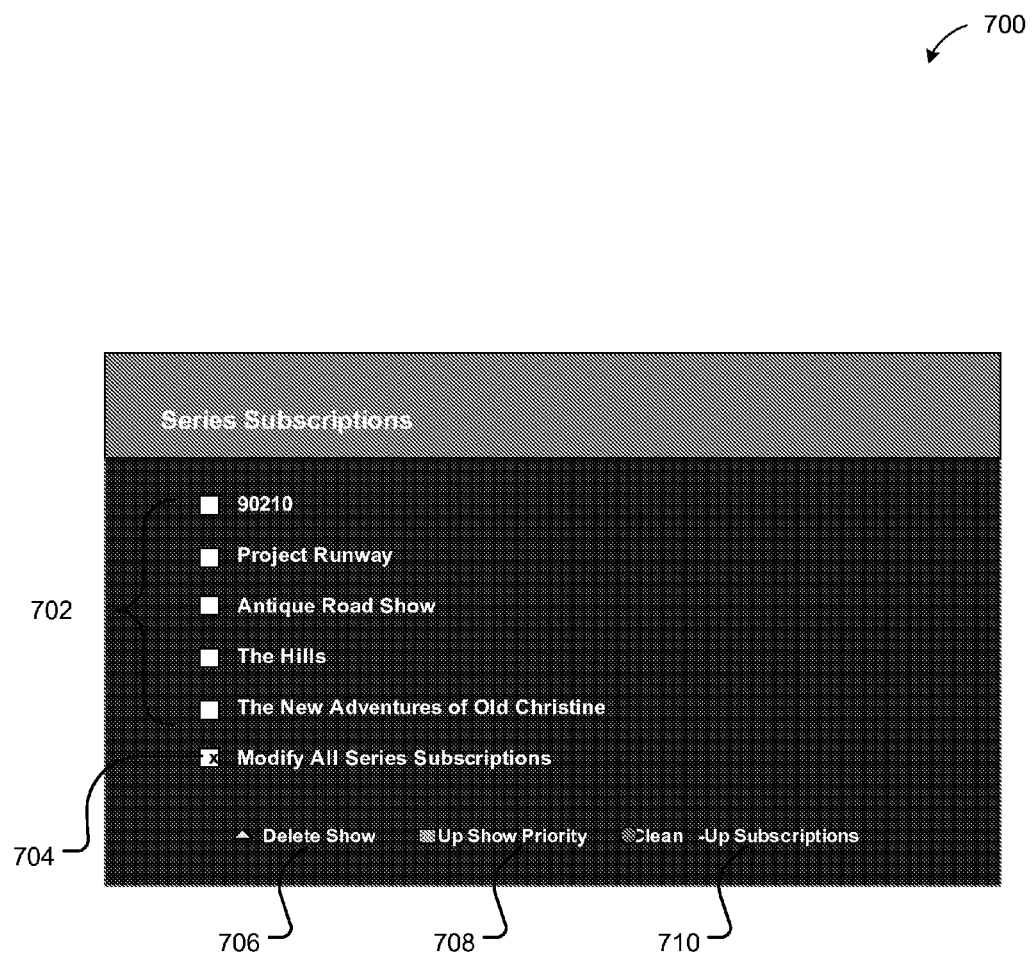
FIG. 7 is a screenshot of a user interface for a system that allows modification of multiple series subscriptions.

FIG. 7 depicts a screen shot of a user interface 700 of a series subscription cleanup application. The user interface 700 includes a listing of multiple series subscriptions 702. In this example, series subscriptions are in place to record episodes of television programs, such as 90210, Project Runway, Antique Road Show, The Hills, and The New Adventures of Old Christine. A user may utilize the user interface depicted in FIG. 7 to select one or more of the series subscriptions to apply an action to, or the user may apply an action to all series subscriptions by checking the modify all series subscription box 704. For example, the user interface may be displayed to a user via the display device 220 of FIG. 2.

The user interface 700 depicted in FIG. 7 also includes an icon 706 that allows the user to delete each series subscription that has been selected to have an action performed thereon. The user interface also includes an icon 708 that allows the user to increment a priority for each series subscription that has been selected to have an action performed on the subscription. The priority may be used, for example, to determine what content should be recorded when the number of programs scheduled for recording exceeds the number of programs that may be recorded at a media recorder device. The user interface also includes an icon 710 that allows the user to perform cleanup operations on each series subscription that has been selected to have an action performed on the subscription. The user interface depicted in FIG. 7 may be displayed on a user's television via a STB, on a mobile device that is capable of accessing a web page displaying the user interface, or a computer capable of accessing the user interface via a data communications network. For example, the user interface 700 may be displayed to a user via display device 220 of FIG. 2 or via the mobile device 412 of FIG. 4.

Figure 8:
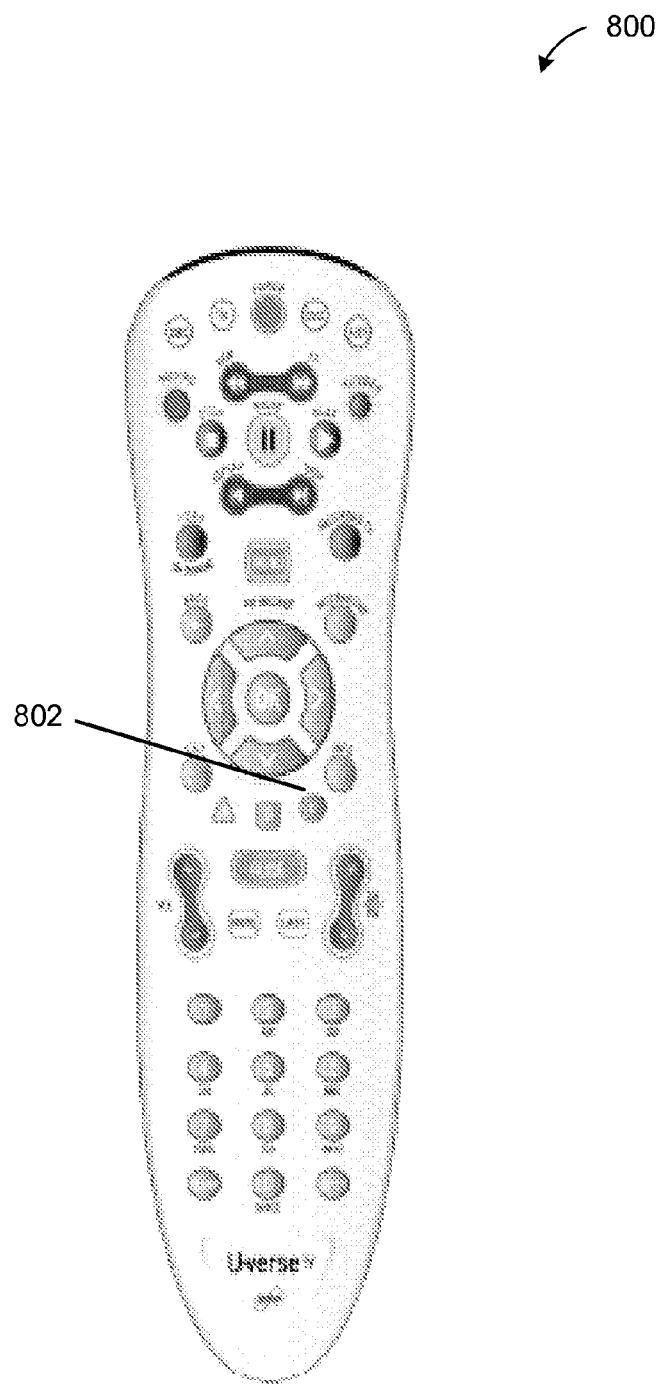
FIG. 8 depicts a remote control for use with a system to compare at least one criterion to content items associated with multiple series subscriptions and to selectively perform actions upon content items that match the at least one criterion.

FIG. 8 depicts a remote control device 800 that may be used in conjunction with a media recorder device. The remote control device 800 includes a smart key select button 802 that allows the user to initiate a series subscription cleanup application. The user may utilize the remote control 800 to navigate the user interface depicted in FIG. 7 and to subsequently initiate cleanup operations by pressing the smart key 802. For example, the remote control device 800 may be the remote control device 202 of FIG. 2.

Figure 9:
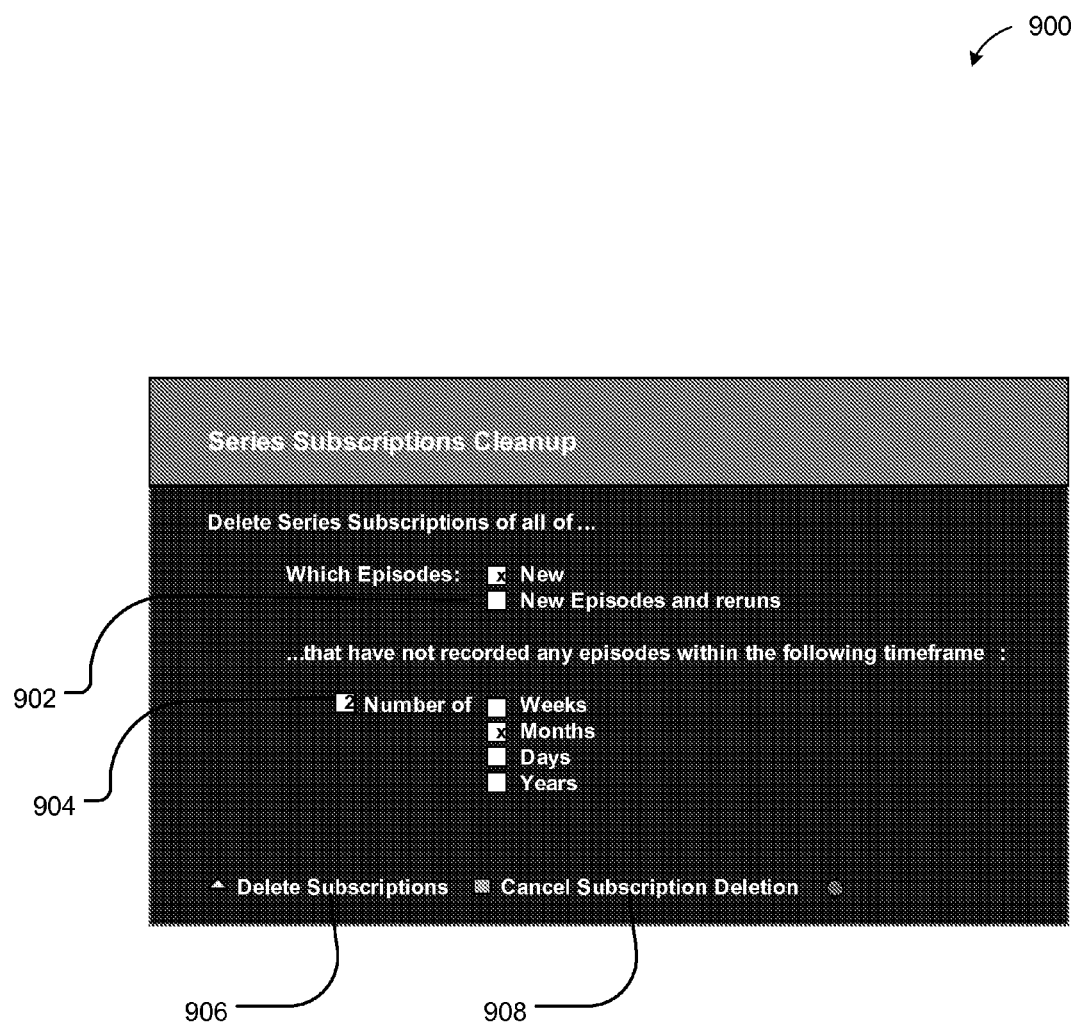
FIG. 9 is a screenshot of a user interface for a system that allows selective deletion of multiple series subscriptions.

FIG. 9 depicts a screen shot of a user interface 900 that allows the user to enter criteria for cleaning up multiple series subscriptions or content items on a media recorder device. The user interface 900 includes selection boxes 902, 904 that enable a user to specify criteria to be applied to all series subscriptions on a media recorder device. For example, using the selection boxes 902, 904, the user may specify that all series subscriptions that have not caused new episodes of a program to be recorded within the last 2 months should be deleted. The user may initiate such a cleanup operation by selecting icon 906 and may cancel the cleanup operation by selecting icon 908. For example, the user interface 900 may be displayed to a user via the display device 220 of FIG. 2.

The user interface 900 depicts an example of cleanup operations that may be initiated by a user. Users may be further enabled to delete subscriptions based on many other criteria. For example, a user may be able to initiate deletion of series subscriptions with scheduled recordings for content that exceed a ratings threshold, initiate deletion of series subscriptions with scheduled recordings of content on a prohibited channel, and initiate deletion of series subscriptions with scheduled recordings that would utilize more than a predetermined amount of memory.

Figure 10:
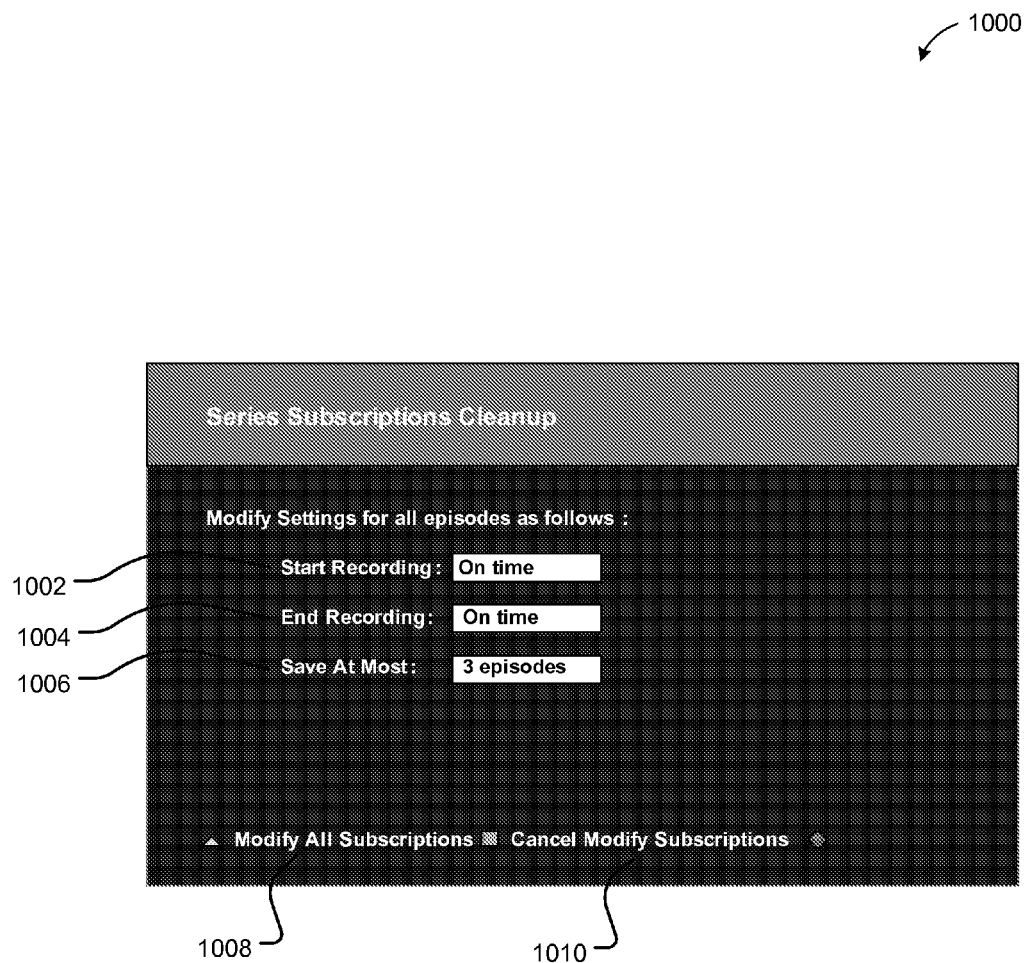
FIG. 10 is a screenshot of a user interface for a system that allows modification of settings for multiple series subscriptions.

FIG. 10 depicts a screen shot of an additional user interface 1000 that allows the user to enter criteria for cleaning up series subscriptions or content items on a media recorder device. In this example, the user interface 1000 has three text boxes 1002, 1004, and 1006 at which a user may enter criteria for modifying series subscriptions at a media recorder device. A user may utilize the text box 1002 to specify a time to start recordings, the text box 1004 to specify a time to end all recordings, and the text box 1006 to specify a maximum number of episodes of a particular program to retain in memory. The user may modify all series subscriptions in accordance with the criteria specified in text boxes 1002, 1004, 1006 by clicking icon 1008. Further, the user may cancel modifications that would result from executing cleanup operations that utilize the criteria specified in text boxes 1002, 1004, and 1006 by clicking an icon 1010. For example, the user interface 1000 may be displayed to a user via the display device 220 of FIG. 2.

FIG. 10 illustrates only one example of cleanup operations that may be initiated by a user through a user interface. Users may be further enabled to delete series subscriptions and take other actions based on many other criteria. For example, a user may be able to initiate deletion of series subscriptions with scheduled recordings for content that exceeds a ratings threshold, initiate deletion of series subscriptions with scheduled recordings of content on a prohibited channel, and initiate deletion of series subscriptions with scheduled recordings that would utilize more than a predetermined amount of memory.

Figure 11:
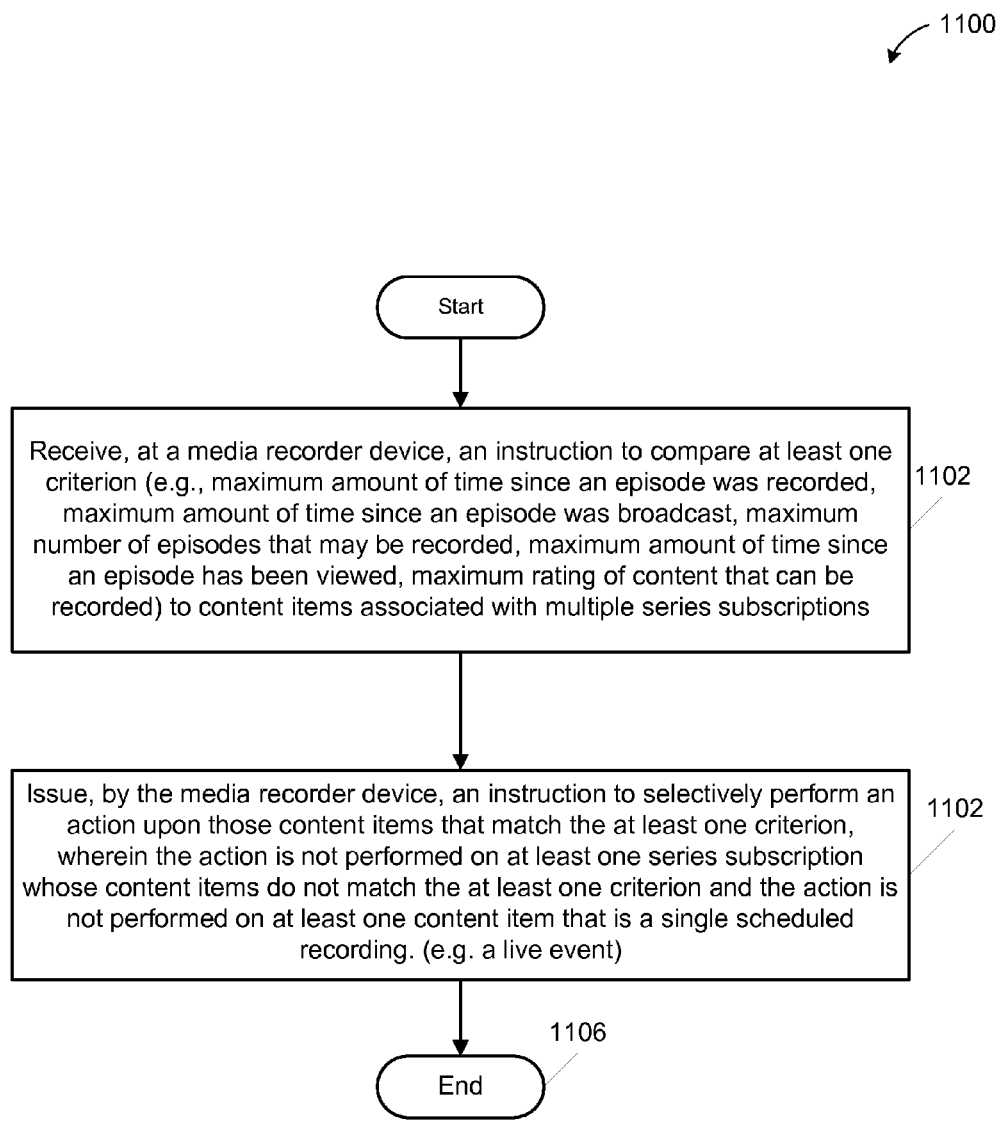
FIG. 11 is a flow diagram of a second particular embodiment of a method to compare at least one criterion to content items associated with multiple series subscriptions and to selectively perform actions upon content items that match the at least one criterion.

FIG. 11 depicts an exemplary method 1100 for cleaning up series subscriptions at a media recorder device. The method includes a media recorder device receiving an instruction to compare at least one criterion to content items associated with multiple series subscriptions, at 1102. The at least one criterion specifies at least one of a maximum amount of time since an episode was recorded based on a series subscription, a maximum amount of time since an episode associated with a series subscription was broadcast, a maximum number of episodes associated with a series subscription that may be recorded, a maximum amount of time since an episode associated with a series subscription has been viewed, and a maximum rating of content that can be recorded based on a series subscription. The content items include at least a first set of episodes to be broadcast that are associated with a first series subscription and a second set of episodes to be broadcast that are associated with a second series subscription. For example, the media recorder device 204 may receive an instruction to compare the at least one criterion 228 to the recorded content items 216 associated with the multiple series subscriptions 218.

Moving to 1104, the media recorder device issues instructions to selectively perform an action upon those content items that match the at least one criterion. In this example, the action is not performed on at least one series subscription whose content items do not match the at least one criterion. For example, one or more of the series subscriptions may not match the at least one criterion so that no action needs to be performed on the series subscriptions that do not match the at least one criterion. In addition, the action may not be performed on a content item that is a single scheduled recording such as a live event. For example, in FIG. 2, the media recorder device 204 may issue an instruction to selectively perform an action upon those recorded content items 216 that match the at least one criterion 218. The method of FIG. 11 terminates at 1106.

The example method depicted in FIG. 11 enables at least one criterion to be applied universally to all series subscriptions at a media recorder device. A user of the media recorder device can therefore establish user defined criteria once and have such criteria applied to all series subscriptions at a media recorder device, without requiring the user to manage series subscriptions on a subscription-by-subscription basis. The example of FIG. 11 provides the user with many possible criterions that the user may define to manage the series subscription on the user's media recorder device.

Figure 12:
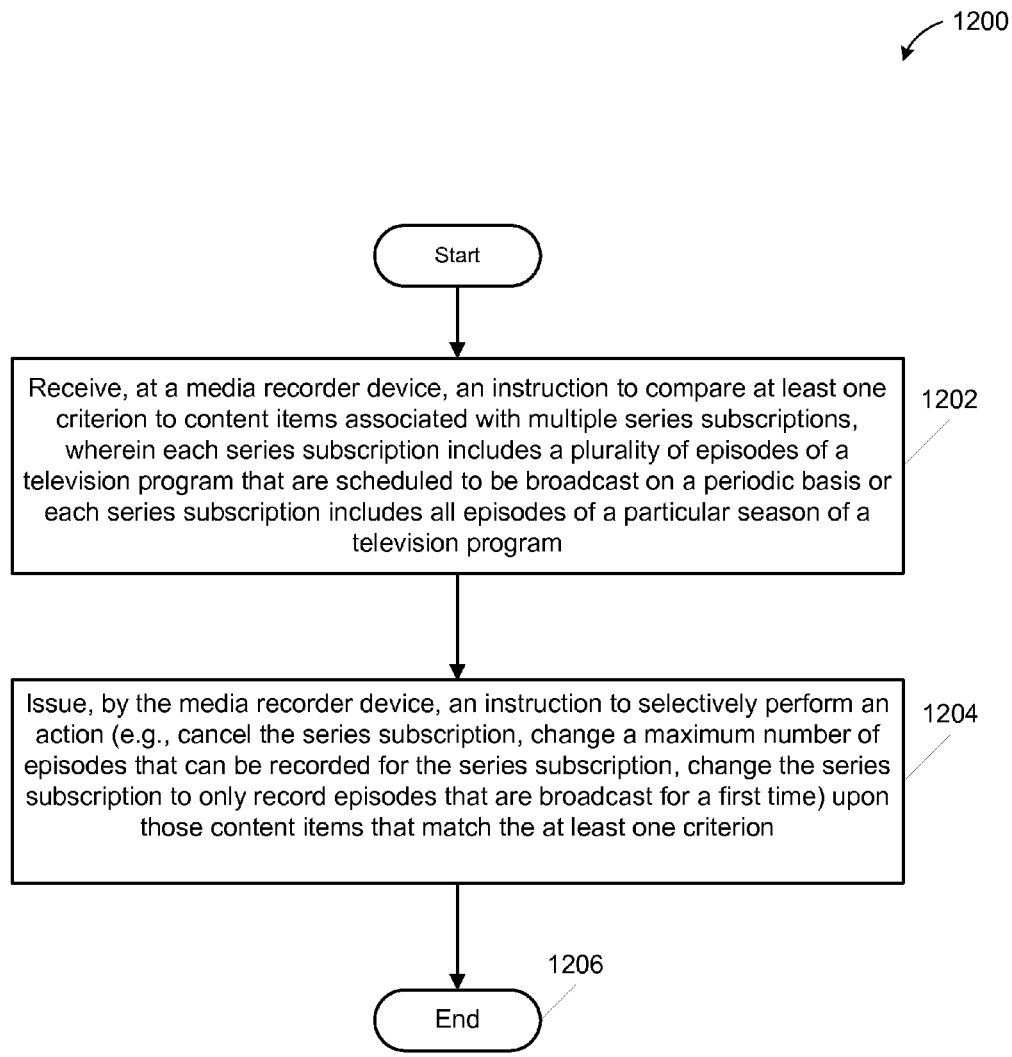
FIG. 12 is a flow diagram of a third particular embodiment of a method to compare at least one criterion to content items associated with multiple series subscriptions and to selectively perform actions upon content items that match the at least one criterion.

FIG. 12 depicts a particular embodiment of a method for cleaning up series subscriptions at a media recorder device. The method includes receiving an instruction to compare at least one criterion to content items associated with multiple series subscriptions, at 1202. For example, in FIG. 2, an instruction may be received at the network server 224 to compare the at least one criterion 240 to the recorded content items 236 associated with the multiple series subscriptions 238. Each series subscription may include a plurality of episodes of a television program that are scheduled to be broadcast on a periodic basis. Each series subscription may also include all episodes of a particular season of a television program.

Moving to 1204, the media recorder device issues instructions to selectively perform an action on those content items that match the at least one criterion. An action to be performed can include cancelling the series subscription, changing a maximum number of episodes that can be recorded for the series subscription, or changing the series subscription to only record episodes that are broadcast for a first time. For example, an instruction to selectively perform an action on recorded content items 236 that match the at least one criterion 240 may be issued by the network server 224. The method terminates at 1206.

The example method depicted in FIG. 12 enables a user of a media recorder device to perform many actions on series subscriptions that match at least one criterion. The user may delete or otherwise modify a series subscription at a media recorder device thereby enabling the user to manage series subscriptions as the user deems appropriate.

Figure 13:
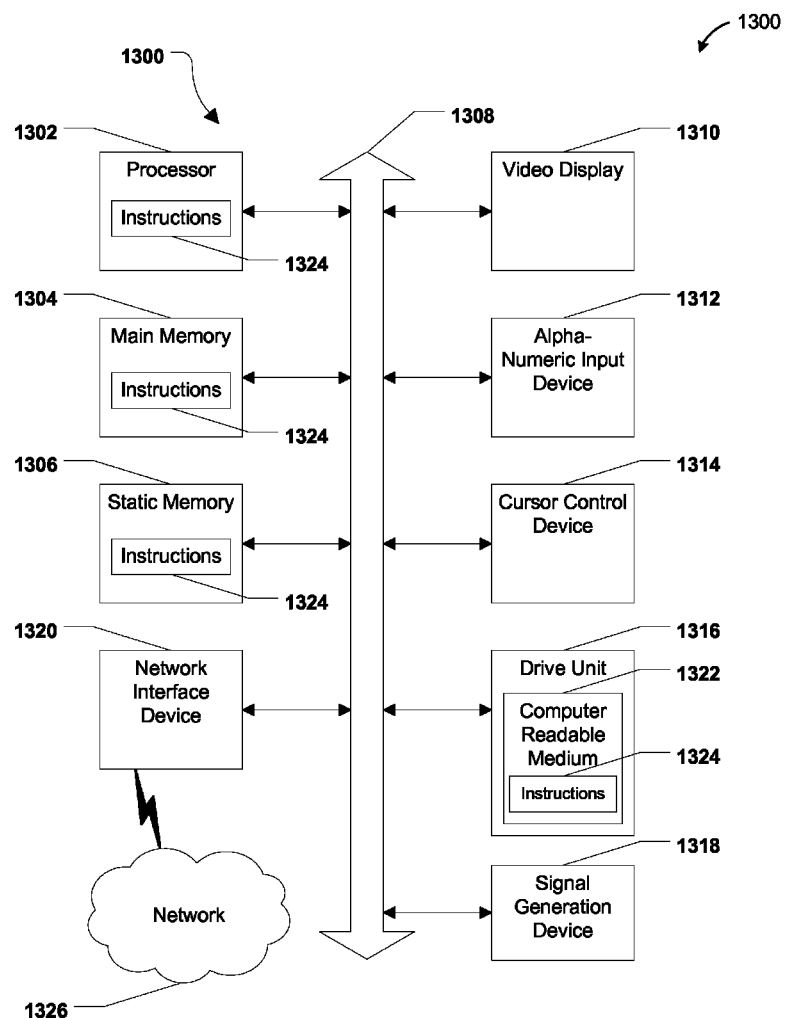
FIG. 13 is a block diagram of an illustrative embodiment of a general computer system.

Referring to FIG. 13, an illustrative embodiment of a general computer system is shown and is designated 1300. The computer system 1300 can include a set of instructions that can be executed to cause the computer system 1300 to perform any one or more of the methods or computer based functions disclosed herein. The computer system 1300 may operate as a standalone device or may be connected, e.g., using a network, to other computer systems or peripheral devices.

In a networked deployment, the computer system 1300 may operate in the capacity of a server or as a client user computer in a server-client user network environment, or as a peer computer system in a peer-to-peer (or distributed) network environment. The computer system 1300 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 1300 may be implemented using electronic devices that provide video, audio, or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1302, e.g., a central processing unit (CPU), a graphics processing unit (GPU), or both. Moreover, the computer system 1300 may include a main memory 1304 and a static memory 1306, which can communicate with each other via a bus 1308. As shown, the computer system 1300 may further include a video display unit 1310, such as a liquid crystal display (LCD), a projection television system, a flat panel display, or a solid state display. Additionally, the computer system 1300 may include an input device 1312, such as a keyboard, and a cursor control device 1314, such as a mouse. The computer system 1300 may also include a disk drive unit 1316, a signal generation device 1318, such as a speaker or remote control, and one or more network interface devices 1320 capable of communicating with network 1326. Some computer systems 1300 may not include an input device (e.g., a server may not include an input device).

In a particular embodiment, as depicted in FIG. 13, the disk drive unit 1316 may include a computer-readable storage medium 1322 in which one or more sets of instructions 1324, e.g. software, can be embedded. Further, the instructions 1324 may embody one or more of the methods or logic as described herein. In a particular embodiment, the instructions 1324 may reside completely, or at least partially, within the main memory 1324, the static memory 1306, and/or within the processor 1302 during execution by the computer system 1300. The main memory 1304 and the processor 1302 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 1324. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    performing, at a media recorder device, a comparison of a user defined criterion to information descriptive of content items associated with a set of series subscriptions stored at the media recorder device; wherein the user defined criterion indicates that new episodes have not been recorded within a time period;
    identifying, at the media recorder device, multiple series subscriptions of the set of series subscriptions based on the comparison;
    deleting the multiple series subscriptions; and
    sending, from the media recorder device, a notification to a display device, the notification indicating that a cleanup operation has been performed on the set of series subscription stored at the media recorder device.

2. The method of claim 1, wherein a recording associated with a series subscription of the multiple series subscriptions is not deleted, the recording stored at the media recorder device.

3. The method of claim 1, wherein the information is received at the media recorder device from a network server, and wherein the media recorder device and the network server are elements of an Internet protocol television system.

4. The method of claim 1, wherein the media recorder device includes a digital video recorder.

5. The method of claim 1, wherein the media recorder device includes a set-top box.

6. The method of claim 1, wherein a series subscription of the multiple series subscriptions includes a plurality of episodes of a television program that are scheduled to be broadcast on a periodic basis.

7. The method of claim 1, wherein the time period is indicated by a number of days, weeks, months, years, or any combination thereof.

8. The method of claim 1, wherein the user defined criterion further indicates that reruns have not been recorded within the time period.

9. The method of claim 1, wherein the user defined criterion further indicates a number of episodes recorded per series, a threshold rating recorded per series, an amount of time since an episode was recorded, an amount of time since an episode was broadcast, an amount of time since an episode was viewed, parental control information, or any combination thereof.

10. A system comprising:
- a processor; and
- a memory accessible to the processor, the memory including instructions that, when executed by the processor, cause the processor to perform operations comprising:
  - receiving a request to perform a cleanup operation associated with a media recorder device; wherein the user defined criterion indicates that new episodes have not been recorded within a time period;
  - in response to receiving the request, performing a comparison of a user defined criterion to information descriptive of content items associated with a set of series subscriptions stored at the media recorder device;
  - identifying multiple series subscriptions of the set of series subscriptions based on the comparison;
  - deleting the multiple series subscriptions; and
  - sending a notification to a display device, the notification indicating that the cleanup operation has been performed on the set of series subscriptions stored at the media recorder device.

11. The system of claim 10, wherein the request to perform the cleanup operation is sent from a mobile device, and wherein the mobile device is distinct from a remote control of the media recorder device.

12. The system of claim 10, wherein metadata is received from a content server and includes information descriptive of episodes of the multiple series subscriptions.

13. The system of claim 12, wherein the multiple series subscriptions are identified based on comparing the user defined criterion to the information descriptive of the episodes and to the information descriptive of the content items.

14. The system of claim 10, wherein the time period is indicated by a number of days, weeks, months, years, or any combination thereof.

15. The system of claim 10, wherein the user defined criterion further indicates that reruns have not been recorded within the time period.

16. A computer-readable storage device storing instructions that, when executed by a processor, cause the processor to perform operations comprising:
- receiving a request to perform a modification operation associated with a media recorder device;
- in response to receiving the request, performing a comparison of a user defined criterion to information descriptive of content items associated with a set of series subscriptions stored at the media recorder device; wherein the user defined criterion indicates that new episodes have not been recorded within a time period;
- identifying multiple series subscriptions of the set of series subscriptions based on the comparison;
- modifying a setting for each of the multiple series subscriptions; and
- sending a notification to a display device, the notification indicating that the modification operation has been performed on the set of series subscriptions stored at the media recorder device.

17. The computer-readable storage device of claim 16, wherein the multiple series subscriptions are stored at an external device accessible to the media recorder device via a network.

18. The computer-readable storage device of claim 16, wherein the user defined criterion further indicates that reruns have not been recorded within the time period.

19. The computer-readable storage device of claim 16, wherein modifying the setting comprises modifying a recording start time of each episode of the multiple series subscriptions, modifying a recording end time of each episode of the multiple series subscriptions, or any combination thereof.

20. The computer-readable storage device of claim 16, wherein modifying the setting comprises modifying a number of recorded episodes that each of the multiple series subscriptions records.

* * * * *